(12) United States Patent
Meadows et al.

(10) Patent No.: US 6,468,318 B1
(45) Date of Patent: Oct. 22, 2002

(54) CASE PARTITION DESIGN FOR CONTINUOUS PLATE STRAP BATTERIES

(75) Inventors: Clarence Alfred Meadows, Muncie; Daniel Robert Brouns, Mc Cordsville, both of IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/491,023

(22) Filed: Jan. 25, 2000

(51) Int. Cl.[7] ............................................. H01M 6/00
(52) U.S. Cl. ..................... 29/623.1; 29/623.2; 29/623.4
(58) Field of Search ........................... 29/623.1, 623.2, 29/623.4

(56) References Cited

U.S. PATENT DOCUMENTS 3,661,651 A * 5/1972 Nishimura et al. ......... 136/170
4,121,017 A * 10/1978 Dougherty et al. ............ 429/7
4,486,516 A * 12/1984 Poe .............................. 429/82

* cited by examiner

Primary Examiner—Hoa Van Le
(74) Attorney, Agent, or Firm—Margaret A. Dobrowitsky

(57) ABSTRACT

This present invention provides a method for creating a gas restrictive interface between a battery case partition formed in a battery case and a battery plate strap, which extends through the partition in a series connection and is part of a battery cell block, which is received within the battery case. The battery case partition includes a notch having a sealing material disposed thereon so that when a heated battery plate strap is positioned within and across the notch, a first gas restrictive interface results between the battery plate strap and the case partition. A battery case lid having a partition tab extending therefrom forms a second gas restrictive interface with top surface if the battery plate strap by being received and secured within the notch of the battery case partition. The bottom edge of the partition tab includes the sealing material to complete the gas restrictive interface.

6 Claims, 4 Drawing Sheets

CASE PARTITION DESIGN FOR CONTINUOUS PLATE STRAP BATTERIES

TECHNICAL FIELD

The present invention relates generally to storage batteries and, more particularly, to a method for creating an interface which prevents cell to cell discharge in batteries employing intercellular plate straps electrically connected to battery plate lugs.

BACKGROUND OF THE INVENTION

Lead acid batteries provide a common source of power for many applications. It is known and desirable to reduce the mass of the battery, the height of the battery, and the number of electrical connections in the battery by casting battery plate straps to battery plate lugs as a solid rectangular piece of lead. This piece of lead not only fuses identically polarized plates within a battery cell but also connects two adjacent cells thereby providing a series connection.

Typically, this arrangement is created by first casting the battery plate straps to the battery lugs in a single cell while the cell is located outside the battery case. Adjacent cells are then placed within the battery case and an intercell weld or bond is formed through or over the partition which separates the adjacent battery cells.

Partitions are necessary in batteries such as the lead acid battery to prevent intercell mixing of acid. Although this problem is limited in an AGM lead acid battery, partitions are still necessary to prevent intercell gas communication. This phenomenon can decrease power output and the life of the battery.

Although the above-described arrangement achieves the above referenced advantages, the arrangement has deficiencies because the intercellular connection of the lead plate strap renders a gas restrictive interface very difficult. The top surface of the battery plate strap is well defined by the mold and its location in reference to the elements within each battery cell can be controlled by a casting machine. However, the battery straps often do not have uniform thickness and the bottom surfaces of the straps are typically rough. These two conditions compounded renders any gas restrictive interface between the plate strap and the battery case partition almost impossible. The additions of sealants or fillers have not proven entirely effective in curing this problem and are of limited application.

It is thus desirable to provide a method of creating a gas restrictive interface between the battery plate straps and the intercell partitions in order to achieve the advantages of the above described arrangement while maximizing battery power and life.

SUMMARY OF THE INVENTION

This invention offers advantages and alternatives over the prior art by providing a method of creating a plastic to lead interface which prevents communication of any substance between adjacent battery cells at the point that the battery plate strap extends through the case partition. The battery plate strap must extend through the case partition to permit a series connection of the battery cells. The present invention provides a gas restrictive interface at this partition—plate strap conjunction which prevents intercellular communication of substances thereby maximizing battery power and life.

The method includes preparing a battery element case having at least one partition with a notch of horizontal and vertical length substantially equal to the width and height of the corresponding battery plate strap. The notch is substantially covered with a reduced plastic. The battery elements are partially inserted within the battery element case and the battery plate straps are cast to the battery plate lugs and between the battery cells. The elements, while still warm, are then fully inserted within the battery element case which causes the battery plate strap to come into contact with the horizontal and vertical portions of the reduced plastic covering the corresponding notch. Due to the heat of the battery plate strap, the reduced plastic surrounding the three sides of the battery plate strap melts or softens and thereby surrounds the battery plate strap and creates a gas restrictive interface.

The fourth interface is created on the top of the battery plate strap after placing the battery case lid onto the battery element case. The lid has a plurality of complimentary notches which each correspond to an individual case partition. The horizontal portion of the complimentary notch has a length substantially equal to the width of the corresponding battery plate strap and is covered in a reduced plastic. As the lid is placed onto the battery element case, the reduced plastic of the complimentary notch comes into contact with the top of the battery plate strap. The heat from the battery plate strap causes the reduced plastic of the complimentary notch to melt or soften and form a gas restrictive interface with the top of the battery plate strap. At this point, a gas restrictive interface has been effectively created between the battery plate strap and the case partition.

The above-described and other features and advantages of the present invention will be appreciated and understood by those skilled in the art from the following detailed description, drawings, and appended claims.

BRIEF DESCRIPTION OF THE DRAWINGS

The present invention will now be described, by way of example only, with reference to the accompanying drawings in which:

FIG. 5b is a bottom perspective view of the battery case lid of FIG. 5a; and

DETAILED DESCRIPTION OF THE INVENTION

Figure 1:
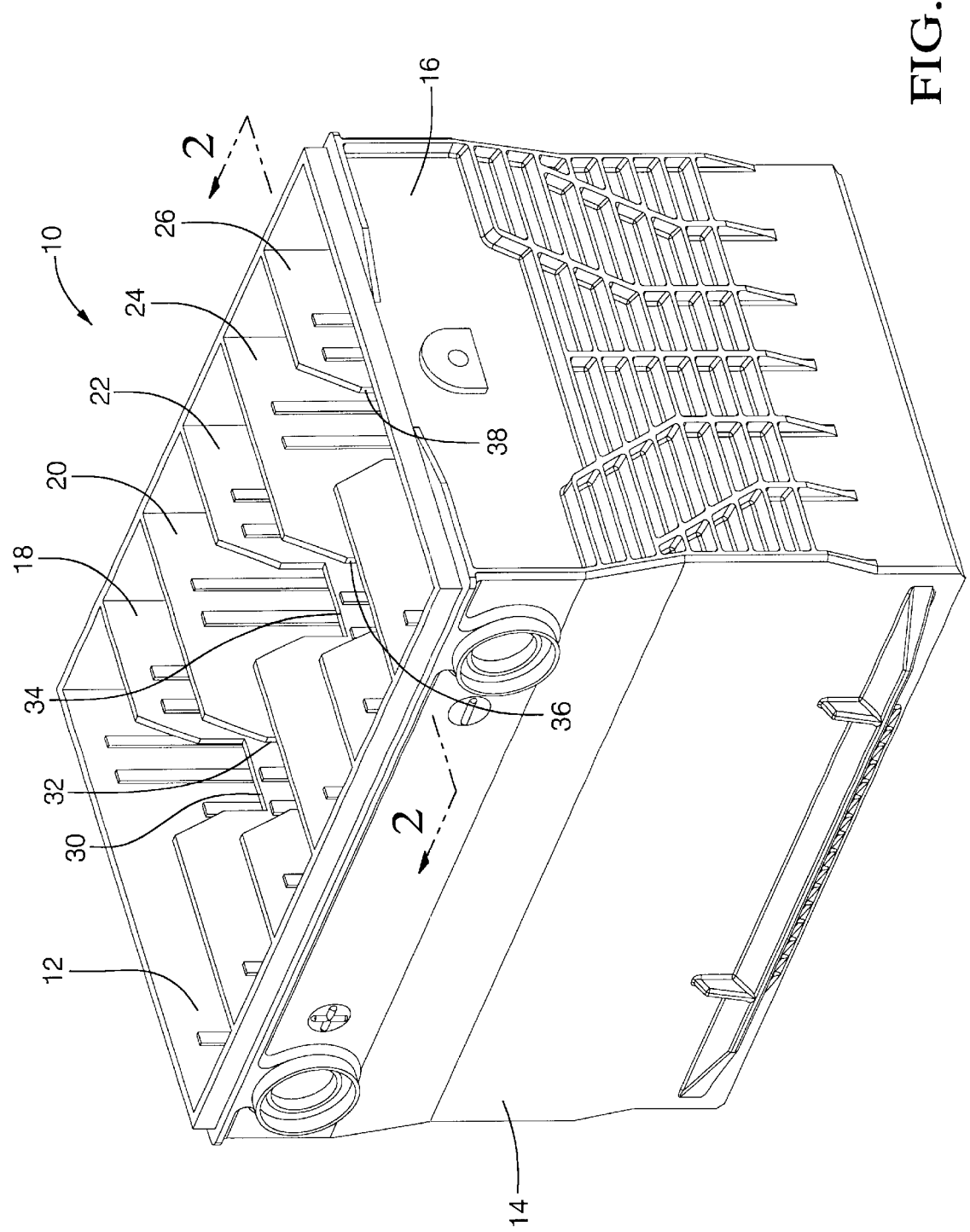
FIG. 1 is a front perspective view of a battery case in accordance with the present invention.
Figure 2:
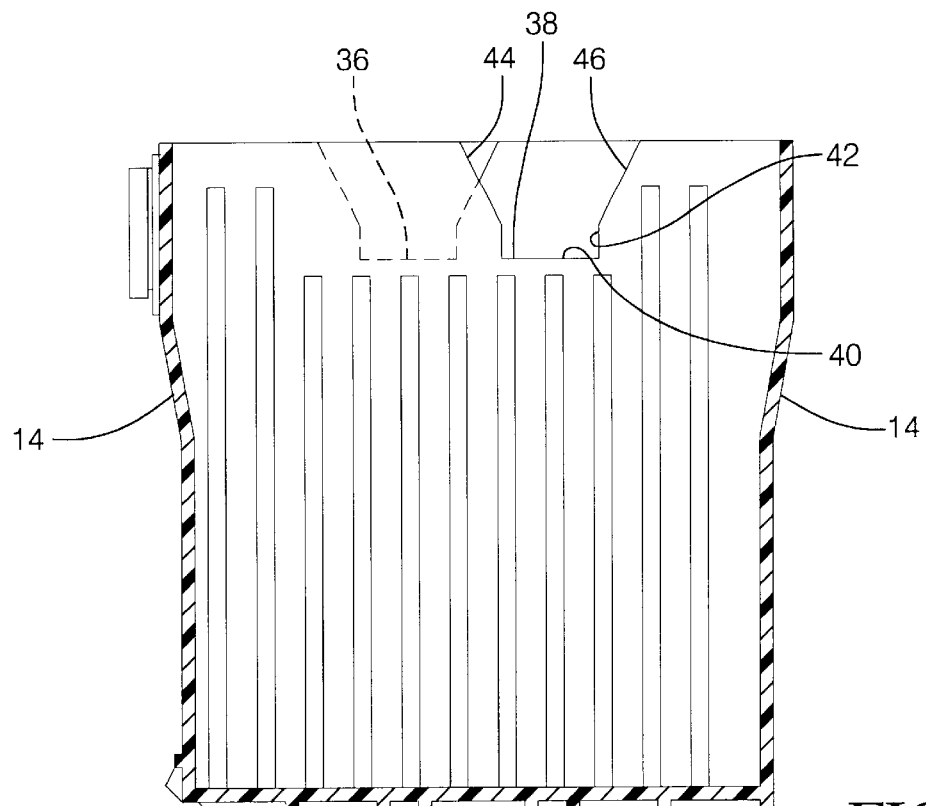
FIG. 2 is a cross-sectional view taken along the line 2—2 of FIG. 1.

Referring first to FIGS. 1–2 in which an exemplary battery case according to the present invention is illustrated and generally indicated at 10. FIG. 1 is a front perspective view of the battery case 10. The battery case 10 comprises a generally rectangular housing having an inner cavity 12 which is partitioned into a predetermined number of individual cavities. The inner cavity 12 is defined by a pair of opposing side walls 14 and a pair of end walls 16 which are preferably integral to one another to form battery case 10. In the illustrated embodiment, the battery case 10 is divided into six (6) individual cell cavities by case partitions 18, 20, 22, 24, 26. Each of the case partitions 18, 20, 22, 24, 26 extends across the battery case 10 between opposing side walls 14 so that the case partitions 18, 20, 22, 24, 26 are substantially parallel relative to one another. Preferably, ends of each case partition intimately contacts side walls 14 so that a seal results therebetween. Although FIG. 1 depicts battery case 10 as having six (6) individual cell cavities, it is understood that the present invention may be employed with batteries having any number of individual cell cavities 12.

Each case partition 18, 20, 22, 24, 26 includes a notch 30, 32, 34, 36, 38, respectively, formed therein. These notches may be better understood with reference to FIG. 2, which is a cross-sectional view of battery case 10 taken along the line 2—2 of FIG. 1. More specifically, FIG. 2 is a cross-sectional view of case partition 26. Notch 38 is formed at a generally top portion of the case partition 26. As with the remaining notches, notch 38 is defined by a substantially horizontal bottom edge 40 having a pair of vertical edges 42 extending upwardly from ends of the bottom edge 40 and a pair of angled edges 44, 46 extend from the vertical edges 42 outwardly towards side walls 14. The location of the notches 30, 32, 34, 36, 38, with reference to a midpoint of the respective case partition, is not uniform among the case partitions 18, 20, 22, 24, 26. Rather, notches 30, 34, 38 axially align with one another, while notches 32, 36 axially align with one another. Accordingly, adjacent case partitions, do not have equivalent notch locations. This is further illustrated in FIG. 2 where the notch 36 formed in the case partition 24, which is positioned immediately adjacent case partition 26, has an alternate notch location shown in phantom. As will be described in greater detail hereinafter, the difference in notch locations in adjacent case partitions corresponds to the placement of battery strap plates 52, 54, 56, 58, 60 (shown in FIG. 3).

FIG. 2 further illustrates that the bottom edge 40 of each of notches 30, 32, 34, 36, 38 is covered with a reduced plastic. This plastic covers the horizontal bottom edge 40 and the vertical edges 42 which generally corresponds to the width and height of the battery strap plates 52, 54, 56, 58, 60. Any number of reduced plastics may be used in accordance with the present invention so long as the reduced plastic is suitable for the application process described hereinafter.

Figure 3:
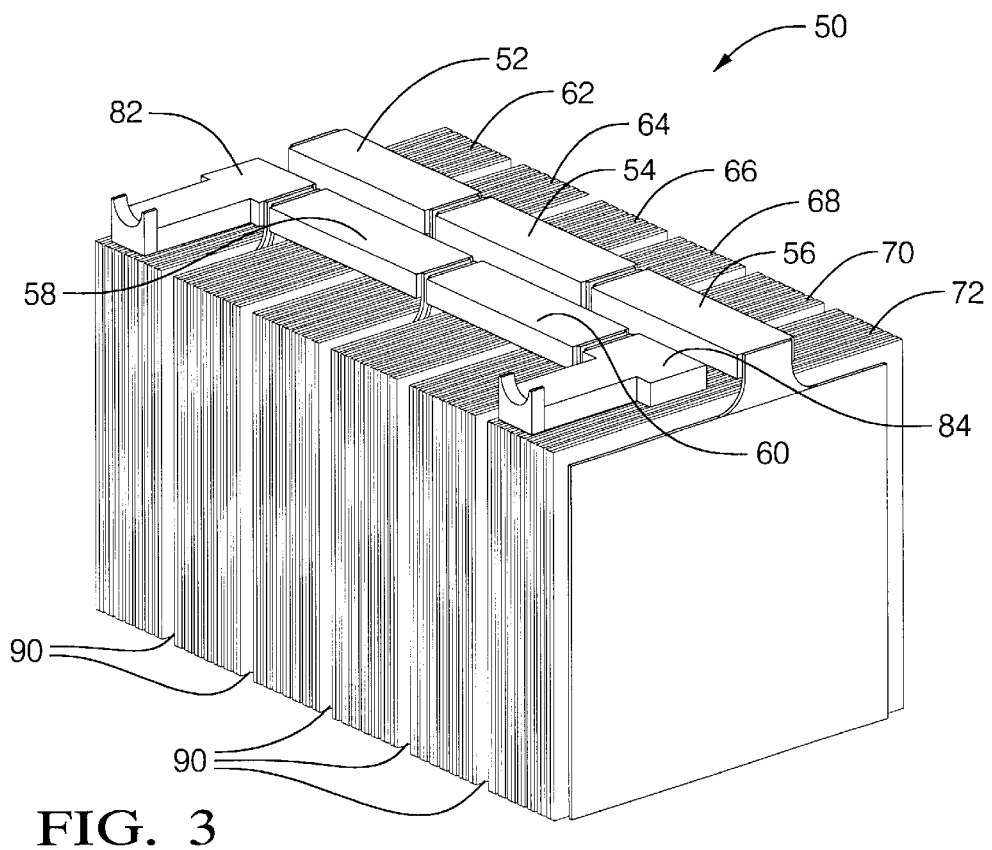
FIG. 3 is a front perspective view of an exemplary battery cell structure including battery straps coupled to battery plate lugs.
Figure 4:
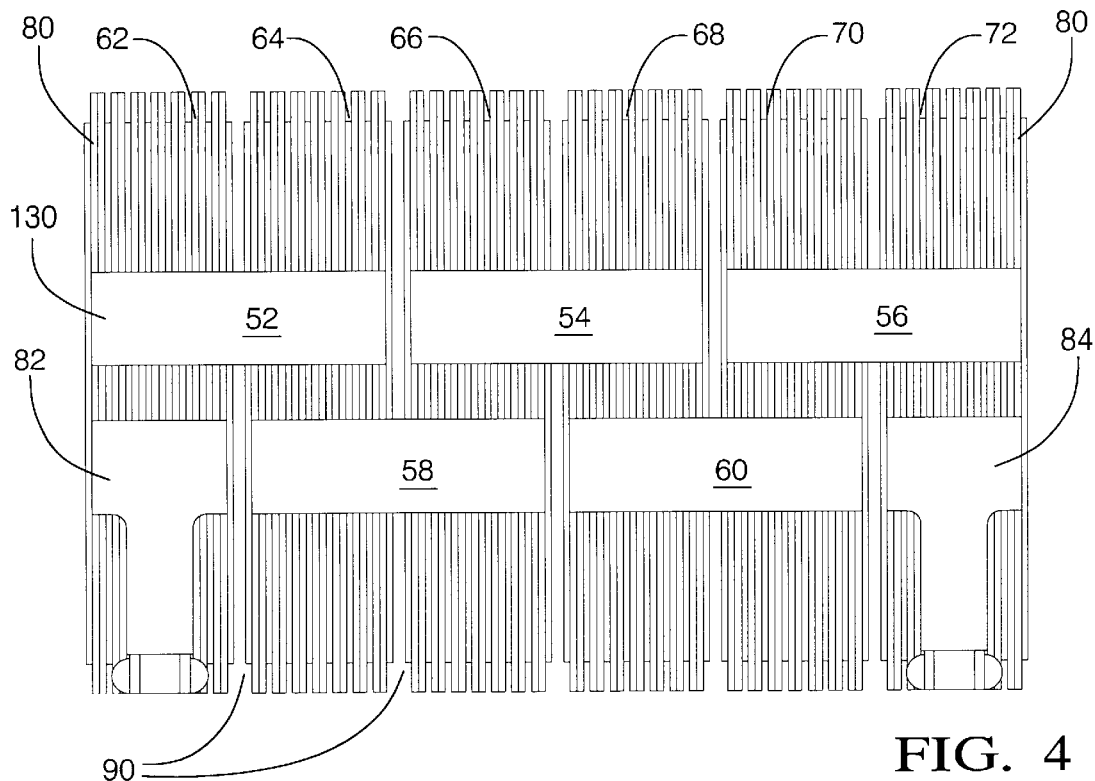
FIG. 4 is a top plan view of the battery cell structure of FIG. 3.
Figure 5A:
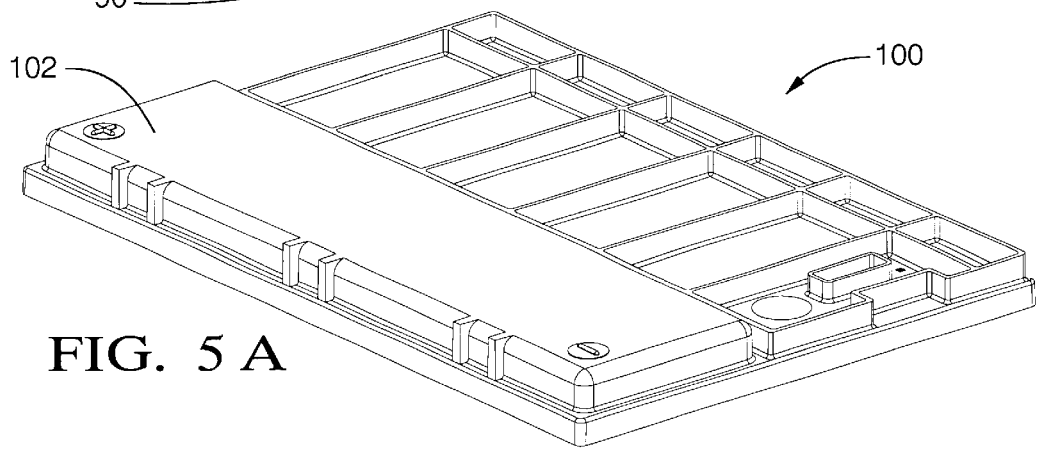
FIG. 5a is a top perspective view of an exemplary battery case lid for attachment to the battery case of FIG. 1.
Figure 5B:
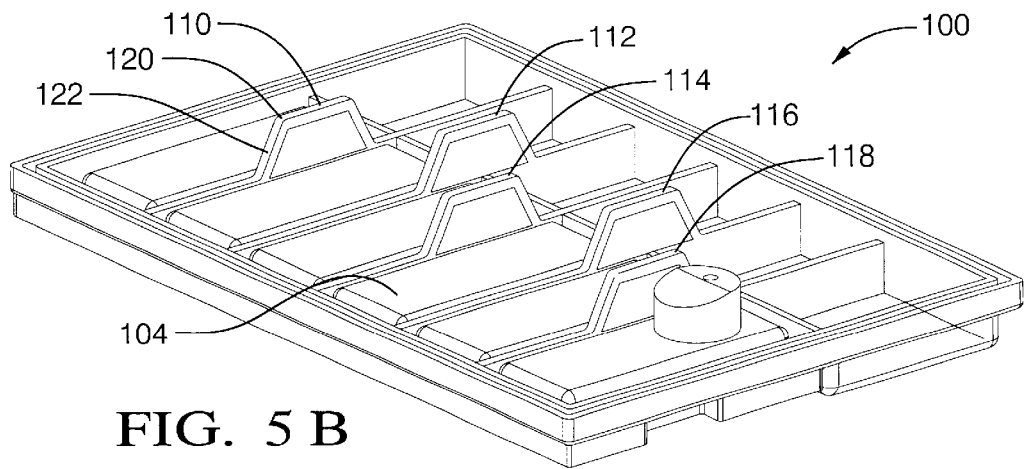

Referring now to FIGS. 3–4 which illustrate an exemplary battery cell structure (block), generally indicated at 50. FIG. 3 is a front perspective view of battery cell structure 50 which comprises a plurality of first battery strap plates 52, 54, 56, 58, 60 electrically connected to a corresponding plurality of battery cells 62, 64, 66, 68, 70, 72, respectively. Each of the first battery strap plates preferably comprises an elongated, generally rectangular, member formed of an electrically conductive material, e.g., lead. Battery cell structure 50 is designed to be securely and complementarily inserted into battery case 10 of FIG. 1. The first battery strap plates 52, 54, 56, 58, 60 connect identically polarized plates 80 (FIG. 4) in battery cells 62, 64, 66, 68, 70, 72 together and also connect two immediately adjacent battery cells, for example, battery cells 62 and 64 or 64 and 66, etc. Accordingly, the length of each first battery strap plates 52, 54, 56, 58, 60 is typically two times the width of the battery cell plus an intercellular distance present between immediately adjacent battery cells. Battery cell structure 50 also includes a plurality of second battery plate straps 82, 84. The second battery plate straps 82, 84 are preferably only as wide as a single battery cell because these second battery plate straps 82, 84 provide the connection of the series to a corresponding battery terminal (not shown).

As best shown in FIG. 4, which is a top plan view of the battery cell structure 50 of FIG. 3, each of battery cells 62, 64, 66, 68, 70, 72 is formed of a number of polarized plates 80. Identically polarized plates 80 within adjacent battery cells are electrically connected to each other by a respective first battery strap plate. For example, first battery strap plate 52 connects the same polarity plates within battery cells 62, 64 and also serves to as the intercellular connection between battery cells 62, 64. Between immediately adjacent battery cells, a space 90 is formed and provides space for the case partitions 18, 20, 22, 24, 26 (FIG. 1) when the battery cell structure 50 is inserted into battery case 10 of FIG. 1. According to the present invention, the case partitions 18, 20, 22, 24, 26 serve to prevent any intercellular substance communication. Therefore, when the case partitions 18, 20, 22, 24, 26 are intimately received within the spaces 90, a gas restrictive interface results therebetween to ensure that intercellular substance communication is prevented between adjacent battery cells. Such unwanted communication can decrease the power and the life of the battery.

Referring now to FIGS. 1–6. According to the present invention, a method is presented for creating a gas restrictive interface between the first battery strap plates 52, 54, 56, 58, 60 and the case partitions 18, 20, 22, 24, 26, respectively. The intercellular connections, important to gain a series connection typical of most batteries, result by having each of first battery strap plates 52, 54, 56, 58, 60 extend through a case partition 18, 20, 22, 24, 26, respectively. For example, when battery cell structure 50 is inserted into battery case 10, first battery strap plate 52 extends through the case partition 18, and more specifically, first battery strap plate 52 extends through notch 30 of case partition 18. Each of first battery strap plates 52, 54, 56, 58, 60 contacts a respective case partition 18, 20, 22, 24, 26 near the midpoint of each first battery strap plate.

As previously discussed, typically, conventional battery plate straps are cast to battery plate lugs in a cell while the elements are outside the battery case. The elements are then inserted into the battery case and the intercellular connections are then formed. Alternatively, the elements can be inserted only partially into the battery case. The casting of the battery plate straps and intercellular connections can be performed simultaneously. The elements can then be fully inserted after casting.

The method of the present invention overcomes the deficiencies associated with the prior art by providing a gas restrictive interface between the first battery plate straps 52, 54, 56, 58, 60 and the case partitions 18, 20, 22, 24, 26 and more specifically with the notches 30, 32, 34, 36, 38 formed therein. As the battery cell structure 50 is inserted into the battery case 10, each of the first battery plate straps 52, 54, 56, 58, 60 contacts a corresponding case partition 18, 20, 22, 24, 26, at a respective notch 30, 32, 34, 36, 38. For example, the first battery strap plate 52 contacts notch 30 of case partition 18. Accordingly, each of the first battery strap plates corresponds to a respective notch such that the first battery strap plate extends across the notch formed in the case partition. Preferably, the horizontal bottom edge 40 and vertical edges 42 of the respective notch are substantially equal to the width and height of the corresponding battery strap plate so that each of battery strap plates 52, 54, 56, 58, 60 forms a tight interface fit in the bottom edge 40 of the corresponding notch 30, 32, 34, 36, 38, respectively.

Preferably, the battery cell structure 50 is inserted into the battery case 10 while the first battery plate straps 52, 54, 56, 58, 60 are still warm. In this manner, as the first battery plate straps 52, 54, 56, 58, 60 come into contact with the corresponding notch 30, 32, 34, 35, 38, respectively, the heat of the battery plate straps causes the reduced plastic covering each notch to melt or soften and conform around the respective battery strap plate. This results in a gas restrictive interface being formed between each of the first battery plate straps 52, 54, 56, 58, 60 and each of the notches 30, 32, 34, 36, 38, respectively. For example, when the first battery strap plate 52 (still warm) is inserted within the battery case 10, it contacts the reduced plastic covering the bottom edge 40 and vertical edges 42 of notch 30 of case partition 18. The plastic will soften or melt to form a gas restrictive interface between the first battery strap plate 52 and the case partition 18. In this manner, the physical properties of the reduced plastic compensate for the rough underside and uneven width of and height of the first battery strap plate 52. At this point, a gas restrictive interface has been formed on three sides (around edges 40, 42) of the first battery strap plate 52.

Referring now to FIGS. 1–5. FIGS. 5a and 5b illustrate bottom and top perspective views of an exemplary battery case lid 100. A gas restrictive interface is formed on the fourth side of the first battery strap plates 52, 54, 56, 58, 60 by placing the battery case lid 100 onto the battery case 10. Battery case lid 100 has a complementary design as battery case 10 and more specifically, is complementary to case partitions 18, 20, 22, 24, 26. Battery case lid 100 comprises a generally rectangular member having an upper surface 102 and an opposing lower surface 104. Battery case lid 100 includes a plurality of partition tabs 110, 112, 114, 116, 118 which extend outwardly away from the lower surface 104 thereof. Each of the partition tabs 110, 112, 114, 116, 118 has a complementary design as the notches 30, 32, 34, 36, 38 so that when battery case lid 100 is secured to battery case 10, the partition tabs are received within the respective notches formed in the case partitions. In other words, each partition tab has a bottom edge 120 and angled edges 122 extending from the bottom edge 120 to the lower surface 104. Each of the partition tabs 110, 112, 114, 116, 118 further includes a layer of reduced plastic covering the bottom edge 120 so than when the battery case lid 100 is placed on and secured to the battery case 10 (without the battery cell structure 50 placed therein), the layer of the reduced plastic on bottom edge 120 completes a generally rectangular area of reduced plastic through which the first battery strap plates 52, 54, 56, 58, 60 will extend. The bottom edge 120 has a length substantially equal to the width of the corresponding first battery strap plate.

After three gas restrictive interfaces have been created on the sides and bottom of the battery plate strap as described hereinbefore as a result of the first battery plate straps contacting notches formed in the case partitions, a fourth gas restrictive interface is formed by attaching the battery case lid 100 to the battery case 10 (with battery cell structure 50 disposed therein) while the first battery plate straps 52, 54, 56, 58, 60 are still warm. In this manner, the reduced plastic on the complimentary partition tabs 110, 112, 114, 116, 118 contacts a top surface 130 of the first battery plate straps 52, 54, 56, 58, 60 and melt or soften to form a gas restrictive interface on the fourth side (top surface 130) of the battery plate straps 52, 54, 56, 58, 60. At this point, the reduced plastic at the respective case partitions 18, 20, 22, 24, 26 substantially surrounds the first battery plate straps 52, 54, 56, 58, 60. For example, the reduced plastic covering the partition tab 110 comes into contact with the first battery plate strap 52, which has previously been placed in the notch 30 of the case partition 18. A gas restrictive interface is created between the four sides of the first battery plate strap 52 and the case partition 18 due to having reduced plastic surrounding all of the interfaces between the first battery plate strap 52 and the case partition 18 and the partition tab 110 of the battery case lid 100. Identical interfaces can be created by the other battery plate straps 54, 56, 58, 60 and case partitions 20, 22, 24, 26 simultaneously and in an identical fashion.

Figure 6:
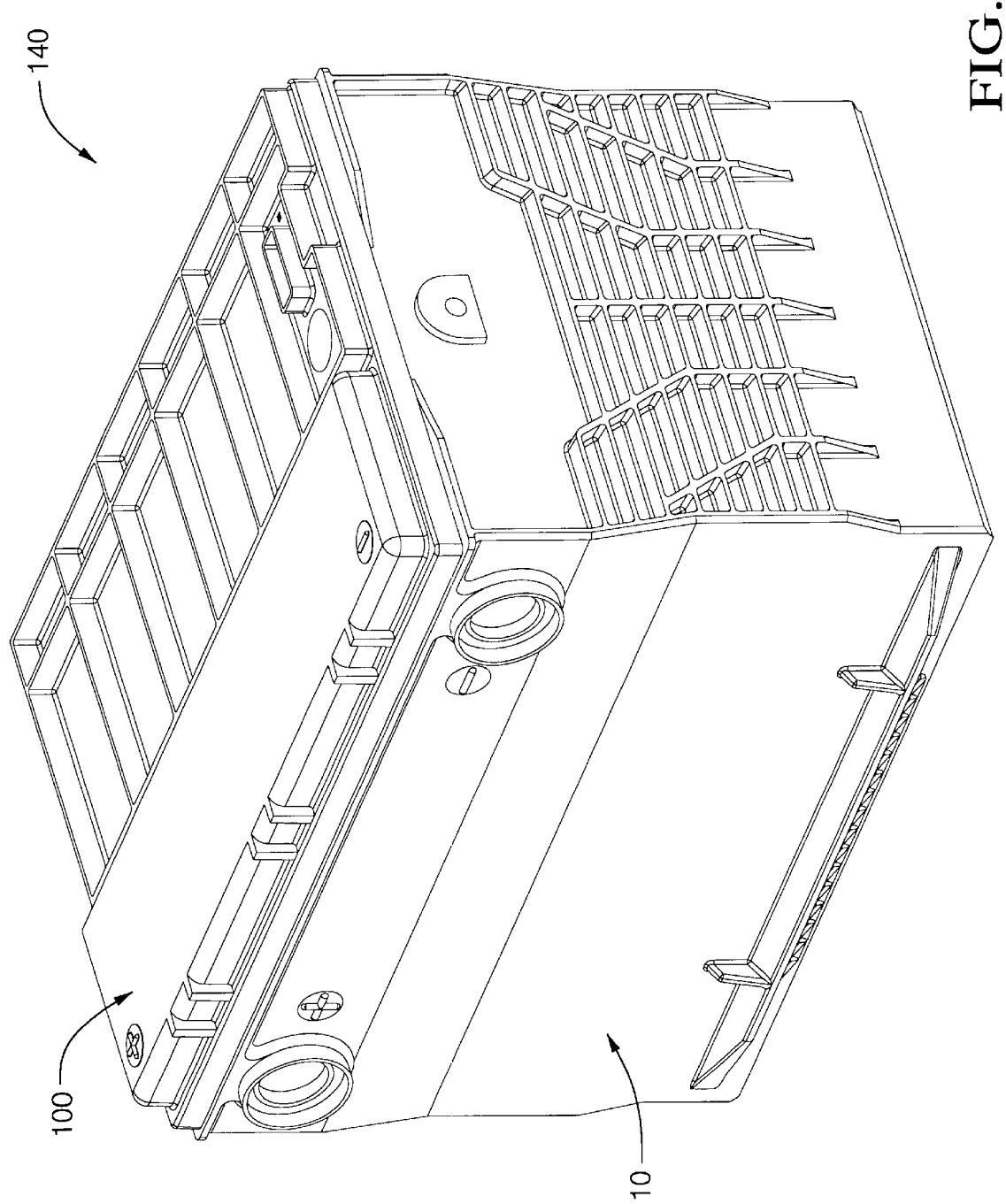
FIG. 6 is a front perspective view of an assembled battery.

Referring now to FIG. 6 in which the battery cell structure 50 (FIG. 3) is disposed within the battery case 10 and battery case lid 100 is attached to battery case 10 to enclose the battery cell structure 50. In this assembled state, a battery 140 is formed. Accordingly, the above described invention permits the battery 140 to be manufactured employing battery plate straps 52, 54, 56, 58, 60 (FIG. 3) cast to the battery plates 80 (lugs) (FIG. 3) as a solid rectangular piece without losing any battery power or battery life due to intercellular substance communication. Thus, the mass and size of the battery 140 and the number of connections within the battery 140 can be reduced without a decrease in battery power or life.

It is to be understood that the size, shape or location of the notches 30, 32, 34, 36, 38 or case partitions 18, 20, 22, 24, 26 can be manipulated depending on the size shape and location of the battery plate straps 52, 54, 56, 58, 60. Further, any plastic or similar type material may be used to create the gas restrictive interface between the battery plate straps 52, 54, 56, 58, 60 and the case partitions 18, 20, 22, 24, 26.

Other advantages provided by the battery 140 of the present invention are that the battery 140 may be designed having a lower height and a reduced current path through the battery 140 due to the first and second battery strap plate designs. Furthermore, there is a reduction in the internal connections within the battery 140. Typically, in continuous plate strap batteries, there are seven (7) internal electrical connections between the existing battery strap plates; however, the battery 140 of the present invention reduced the number of internal connections to two (2) namely between the second battery strap plates 82, 84 which provide the connection of the series to a corresponding battery terminal.

It is also to be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. A method of creating a gas restrictive interface in a battery between at least one battery strap plate of a cell block and at least one battery case partition of a battery case, comprising:

forming a notch in an upper portion of the at least one battery case partition;

disposing a sealing material on at least a portion of the notch;

inserting the cell block within the battery case so that the at least one case partition separates cells of the cell block, the at least one case partition extending above a top surface of the at least one battery plate strap which electrically connects one cell to a next adjacent cell;

forming a first seal between the at least battery plate strap and the notch by disposing the at least one battery strap plate in a heated state across the sealing material disposed in the notch; and attaching a battery case lid to the battery case, the battery case lid having at least one partition tab which is complementary to the notch and received therein when the battery case lid is attached to the battery case, wherein a bottom surface of the at least one partition tab includes the sealing material disposed thereon so that a second seal results between a top surface of the heated at least one battery strap plate and the bottom surface of the at least one partition.

2. The method as set forth in claim 1, wherein the sealing material comprises a reduced plastic.

3. The method as set forth in claim 1, wherein the first seal is formed between bottom and side surfaces of each of the at least one battery strap plate and the notch.

4. The method as set forth in claim 1, wherein the second seal is formed between a top surface of the at least one battery strap plate and a bottom surface of the at least one partition tab.

5. The method as set forth in claim 1, wherein the first and second seals comprise gas restrictive interface seals between the at least one battery strap plate, the notch, and the at least one partition tab.

6. A method of fluidly isolating the cells of a battery, comprising:

electrically securing each of a plurality of battery cells to each other by welding a plurality of battery strap plates to said battery cells, said battery strap plates being heated during the welding of said plurality of battery strap plates to said battery cells;

inserting said plurality of battery cells into a plurality of cell openings defined in a battery housing prior to the cooling of said battery strap plates, a portion of said battery strap plates being received within a respective opening in a plurality of partition walls defining said plurality of cell openings, said plurality of battery strap plates melting a portion of said opening; and sealing said plurality of cell openings by securing a lid portion to said housing, said lid portion having a plurality of partition tabs being configured to be received within said openings, said plurality of battery straps melting a portion of said partition tabs as said lid portion is secured to said housing.

* * * * *